(No Model.)

R. M. HUNTER.
ELECTRICAL TRANSFORMER.

No. 528,778. Patented Nov. 6, 1894.

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

ELECTRICAL TRANSFORMER.

SPECIFICATION forming part of Letters Patent No. 528,778, dated November 6, 1894.

Application filed April 6, 1894. Serial No. 506,529. (No model.)

*To all whom it may concern:*

Be it known that I, RUDOLPH M. HUNTER, of the city and county of Philadelphia and State of Pennsylvania, have invented an Improvement in Electrical Transformers, of which the following is a specification.

My invention has reference to electrical transformers, and consists of certain improvements which are fully set forth in the following specification and shown in the accompanying drawings which form a part thereof.

This application, Case No. 272, has particular reference to the construction of induction coils or transformers with the object in view of producing an exceedingly high insulation between the several conductors or turns of the conductors making up the coils thereof.

Heretofore in the manufacture of converters it has been customary to employ coils of wire insulated in the ordinary manner, or by inclosing said coils in an outer wrapper of textile fabric with free access to the atmosphere; and in some cases the insulated wires making up the coils have been immersed in oil, the use of which is both troublesome and expensive.

In carrying out my invention I inclose the coils of the converter within a lead case and hermetically seal them therein. The coils of the converter may be made up of wires wrapped only in fibrous covering, either of textile fiber or paper. Prior to sealing the coils in the lead case, they are thoroughly dried in a heated oven to expel all moisture. While in this heated condition they are placed in the case and pulverized quick lime or chloride of calcium, or their equivalent, is introduced inside of the case, and it is hermetically sealed. The slaked lime or its equivalent has the property of absorbing moisture, and thoroughly removes the last trace of moisture from the wires, and prevents accumulation of moisture in the atmosphere within the case at any time. The insulation thus produced is most perfect, and will remain in this condition indefinitely. The terminal wires of the two coils are brought through suitable apertures and hermetically sealed within by any suitable sealing substance such as a mixture of pitch and rosin or any viscous material adapted to the purpose.

My invention will be better understood by reference to the accompanying drawings, in which—

Figure 1:
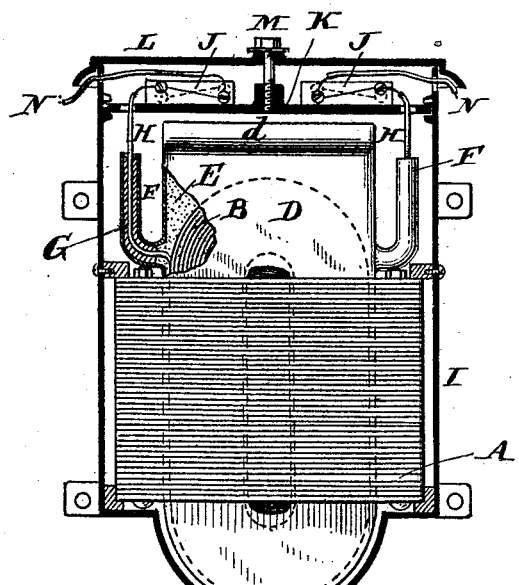
Figure 2:
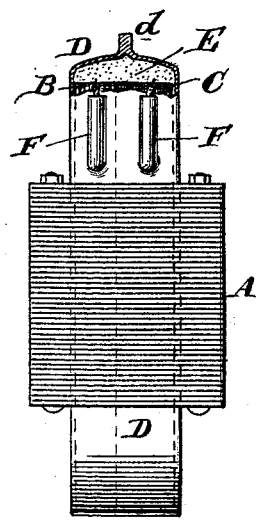
Figure 3:

Figure 1 is a sectional elevation of a converter embodying my invention. Fig. 2 is a side elevation of the converter proper removed from the outer casing with the upper portion of the lead case in section; and Fig. 3 is a cross section of one of the electrical conductors.

A is a series of highly annealed iron plates forming the core of the converter and may be made in any of the usual well known ways.

B and C are the two parallel coils of wire, usually formed of different lengths and diameters according to the ratio of conversion required. These coils are inclosed in a lead case D and are supported in the iron core in the usual position.

H are the terminal wires from the several coils and are brought out through tubular projections by any suitable impervious substance such as pitch, or rosin, or a mixture thereof, with or without any other suitable well known substances, which shall have the property of hermetically sealing the entrance to the casing against moisture. Prior to sealing the upper part of the casing D, the same is thoroughly heated so as to drive out all the moisture from the coils within the case, and powdered quick lime, or other equivalent substances such as chloride of calcium, is inserted within the case D while warm, and the end of the case is sealed as at *d* preferably by a burned or fused joint. Every trace of moisture will in this manner be eliminated from the coils of wire forming the circuit for the current within the converter. The coils may be simply wrapped in cotton in the usual way or may have a paper covering. In fact any good dry fibrous coating may be employed. It is also clear that the wire R may have its covering of insulation S impregnated with the quicklime as indicated at *e* in Fig. 3, the completed conductor being represented by the letter H.

I is an iron casing for supporting the converter proper. Arranged within the casing I and near the upper part is a diaphragm K locked in position within the case and adapted as a base into which to screw the screw M for holding the cap or cover L in position.

J are the fuse blocks containing the fuses which are interposed between the terminals H of the coils of the converter and the wires N of the converter as a whole. The construction of these fuses may be that heretofore employed. I prefer to employ lead as the inclosing case for the coils as it is easily formed and handled and is hermetically proof against the permeation of moisture.

I do not confine myself to the minor details of construction or the shape of the parts, as any of these may be greatly varied without departing from the principle of my invention.

What I claim as new, and desire to secure by Letters Patent, is—

1. An electrical converter having its coils hermetically sealed within a lead case, and a powdered moisture absorbent contained within the lead case.

2. In an electrical converter, the combination of the coils thereof insulated with a wrapper of porous fibrous material, an inclosing case hermetically sealing the said coils, and an atmosphere within the case and surrounding the insulated wires free from moisture.

3. In an electrical converter, the combination of the coils thereof insulated with a wrapper of porous fibrous material, an inclosing case hermetically sealing the said coils, an atmosphere within the case and surrounding the insulated wires free from moisture, and a moisture absorbent substance within the hermetically sealed case.

4. In an electrical converter, the combination of the coils thereof insulated with a wrapper of porous fibrous material, an inclosing case hermetically sealing the said coils, an atmosphere within the case and surrounding the insulated wires free from moisture, four or more terminals from the coils within the case extending to without the same, and moisture proof seals sealing the outlets for said terminals.

5. The combination of the electrical coils of the converter, an inclosing metallic case fitting the said coils and hermetically sealing the same against the atmosphere provided with one or more tubular projections, terminal wires extending from the coils through the said tubular projection or projections, and a sealing substance filling the said tubular projections to seal the case against the admission of moisture.

6. The combination of the converter coils and core, an outer inclosing metallic case for the same, a diaphragm detachably connected near one end of the case, a removable cap or cover fitting the extreme end of the case, a locking screw for connecting the cap or cover to the diaphragm, fuse blocks arranged upon the diaphragm and adjacent to the cap or cover, and connecting circuits leading from the coils to the exterior of the case and including the fuses.

In testimony of which invention I have hereunto set my hand.

R. M. HUNTER.

Witnesses:
ERNEST HOWARD HUNTER,
HELEN L. MOTHERWELL.